United States Patent
McDonald (10) Patent No.: US 8,076,625 B2
(45) Date of Patent: Dec. 13, 2011

(54) FIELD LEVEL TRACKER CONTROLLER

(75) Inventor: Mark McDonald, Milpitas, CA (US)

(73) Assignee: SolFocus, Inc., San Jose, CA (US)

( * ) Notice: Subject to any disclaimer, the term of this patent is extended or adjusted under 35 U.S.C. 154(b) by 396 days.

(21) Appl. No.: 12/392,316

(22) Filed: Feb. 25, 2009

(65) Prior Publication Data

US 2010/0212653 A1    Aug. 26, 2010

(51) Int. Cl.
*F24J 2/38* (2006.01)
(52) U.S. Cl. ............... 250/203.4; 136/244; 126/572; 126/593
(58) Field of Classification Search ......... 250/203.1, 250/203.3, 203.4, 216; 126/572, 573, 593, 126/595, 600; 136/244, 246
See application file for complete search history.

(56) References Cited

U.S. PATENT DOCUMENTS

| | | | |
|---|---|---|---|
| 4,320,288 A | 3/1982 | Schlarlack | |
| 5,886,890 A | 3/1999 | Ishida et al. | |
| 6,465,725 B1 | 10/2002 | Shibata et al. | |
| 6,680,693 B2 | 1/2004 | Urban et al. | |
| 7,772,716 B2 | 8/2010 | Shaver, II et al. | |
| 2008/0121272 A1 | 5/2008 | Besser et al. | |
| 2008/0147335 A1 | 6/2008 | Adest et al. | |
| 2008/0236648 A1 | 10/2008 | Klein et al. | |
| 2008/0283043 A1 | 11/2008 | Hong | |
| 2008/0308091 A1 | 12/2008 | Corio | |
| 2009/0114211 A1* | 5/2009 | Homyk et al. | 126/578 |

FOREIGN PATENT DOCUMENTS

| | | |
|---|---|---|
| EP | 1860386 A1 | 11/2007 |
| JP | 07022639 A | 1/1995 |
| JP | 2005252172 A | 9/2005 |
| JP | 2008300745 A | 12/2008 |
| WO | 2008003023 | 1/2008 |

OTHER PUBLICATIONS

International Search Report and Written Opinion dated Dec. 9, 2010 for PCT/US2010/023618.
International Search Report and Written Opinion dated Dec. 13, 2010 for PCT/US2010/023591.
Femia, N. et al., "Distributed Maximum Power Point Tracking of Photovoltaic Arrays: Novel Approach and System Analysis," IEEE Transactions on Industrial Electronics, vol. 55, No. 7, Jul. 2008, pp. 2610-2621.
Office Action dated Mar. 22, 2011 for U.S. Appl. No. 12/393,009.

* cited by examiner

*Primary Examiner* — Kevin Pyo
(74) *Attorney, Agent, or Firm* — The Mueller Law Office, P.C.

(57) ABSTRACT

The present invention is directed to an apparatus and method for improving the total power output from a field of solar energy systems. The invention provides a field level tracker controller which calculates an improved positioning of individual solar energy systems and communicates those configurations to trackers in the field. An algorithm stored in the controller calculates the improved configuration for the solar energy systems based on factors such as solar movement, shade patterns generated by surrounding structures, and measured output of the energy systems. Improved positioning may include individual energy systems being directed to a stowed position to maximize the power output of the field as a whole.

24 Claims, 8 Drawing Sheets

FIELD LEVEL TRACKER CONTROLLER

RELATED APPLICATIONS

This application is related to McDonald et al, U.S. patent application Ser. No. 12/393,009, entitled "Field Level Inverter Controller," filed on even date herewith and hereby incorporated by reference.

BACKGROUND OF THE INVENTION

Solar energy systems are used to collect solar radiation and convert it into useable electrical energy. A system typically includes an array of solar energy units mounted on a tracker and a controller directing the tracker via a drive motor. Automated tracker controllers for solar energy systems are used to direct solar energy units to follow the path of the sun. The controller generally relies on the precise and accurate position of the tracker, a clock or timing mechanism and the ephemeris equation to calculate the relative direction of the solar radiation with respect to an array of solar energy units. Controllers typically control a single tracker that may support one or more arrays of solar energy units. A solar energy unit may be a concentrating photovoltaic (CPV) solar energy device, which is a device that utilizes one or more optical elements to concentrate incoming light onto a photovoltaic cell. This concentrated light, which may exhibit a power per unit area of 500 or more suns, relies on precise orientation to the sun in order to provide improved performance.

One or more CPV devices may be assembled into an array. Such arrays are mounted on a tracking apparatus that may include a rigid support structure, drive motors, and cooling mechanisms. Trackers may pivot and rotate several solar energy arrays simultaneously to follow the path of the sun. Trackers are typically distributed relative to one another in such a way as to provide a maximum exposure to sunlight while minimizing the shade profile that one array may have on another. This results in a sparse distribution of trackers in a field. Distribution may be measured as two-dimensional ground cover density (GCD2D). Improvements are needed in order to provide a denser distribution of trackers to maximize the amount of solar energy collected per area.

Periodically individual solar energy systems in a field may break down. The resulting inoperative tracker or solar energy device may generate shade on nearby arrays as the sun changes elevation. Consequently, performance in neighboring solar energy systems may be reduced. The shade patterns of surrounding structures (e.g., wind turbines, buildings, landscape elements and trees) may also impact the maximum possible power output of a field of solar energy systems. Current tracker controllers do not account for elements in the landscape that may periodically block solar radiation, such other trackers, trees, buildings or inoperative trackers. Furthermore, trackers designed to maximize power output at the array level can result in sub-optimal power generation of the field as a whole.

Thus, there exists a need for improved tracker controllers which enable a denser distribution of solar energy systems and provide dynamic control of individual trackers in order to maximize the power output of a field of solar energy systems.

SUMMARY OF THE INVENTION

A method and apparatus are provided for controllably positioning one or more individual trackers for solar energy systems in a field of solar energy systems. Individual solar energy systems may include a tracker, drive motor, solar energy device and a means for measuring the energy output. The solar energy device may include one or more arrays mounted on a tracker, and the arrays may include one or more solar energy units. The method and apparatus may orient the trackers in a field to generate the maximum potential power (MPP) output of the sum of the power outputs from the individual solar energy systems. The field level tracker controller of this invention may calculate an improved configuration for individual solar energy systems based on factors such as the location and dimensions of surrounding structures, solar movement, the electronic arrangement of solar energy units in a solar energy system, and measured output of an energy system compared to expected output of that system. The field level tracker controller includes an input means, a programmable controller in communication with the field of solar energy systems, and means for storing an algorithm to calculate the improved configuration of the solar energy systems for the MPP of a field of solar energy systems.

According to one embodiment of this invention the field level tracker controller may include an input means for entering the location and dimensions of individual solar energy systems in a field as well as the electronic arrangement of solar energy units in the system. The controller may also include a storage means for storing an algorithm that calculates an improved configuration of individual solar energy systems for maximum potential power (MPP) output of the sum of the solar energy systems based on the location and dimensions of each solar energy system in the field, the measured the power output generated by each solar energy systems in the field, the electronic arrangement of solar energy units in an array and the ephemeris equation for solar movement. In another embodiment, the field level tracker controller may orient a first portion of solar energy systems to provide a minimum shade pattern on a second portion of solar energy systems in order to provide for maximum potential power output of the sum of solar energy systems in a field. The minimum shade pattern on the systems in a field may be calculated by an algorithm using the ephemeris equation, location and dimensions of individual solar energy systems or other structures in the field to calculate the shade pattern generated by individual trackers or others structures. In a further embodiment the field level tracker controller may monitor the output of individual solar energy systems and calculate an improved set of positions where one or more solar energy trackers may be malfunctioning. The field level controller system offers the unique aspect of maximizing power output for a field of solar energy systems as a whole rather than on an individual system basis.

DETAILED DESCRIPTION

The present invention will now be described more fully herein with reference to the accompanying drawings. This invention may, however, be embodied in many different forms and should not be construed as limited to the embodiment set forth herein; rather, these embodiments are provided so that this disclosure will be thorough and complete and will fully convey the scope of the invention to those skilled the art. Like numbers refer to like elements throughout.

In one embodiment of this invention, a field level tracker controller may controllably position one or more individual solar energy systems in a field of solar energy systems. A solar energy system may include one or more arrays of units used for converting solar energy into useable electrical energy. The solar energy units in an array may be combined electrically in one or more strings. The solar energy units may be concentrated photovoltaic devices. The solar energy units may be flat panel solar energy devices. A solar energy system may also comprise a tracker to direct the array of units to face incoming solar radiation. A field of solar energy systems may include any number of solar energy systems greater than one. A field of solar energy systems may include 10, 50, 100 or more systems. A tracker may be any device which follows the path of the sun. A tracking device may have any configuration, such as a single or multiple pedestal support configurations as well as designs that utilize a combination supports and sliding rails, pin joints, ball and sockets, rotating wheels and more.

Figure 1:
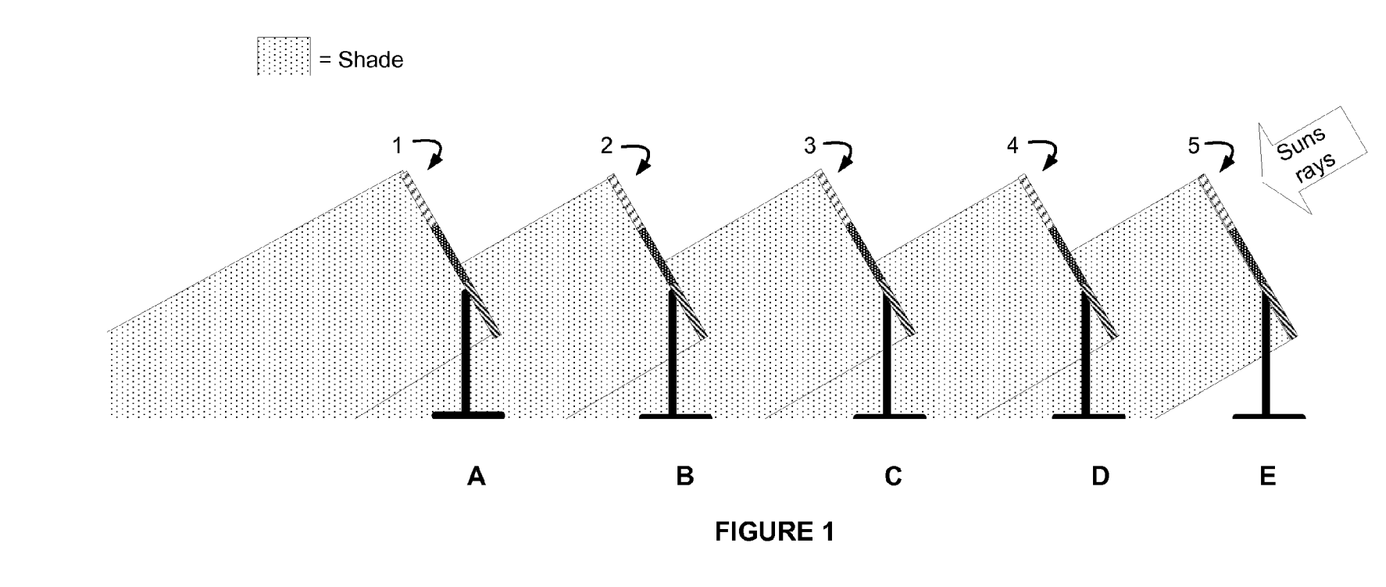
FIG. 1 depicts a schematic view of a field of solar energy systems.
Figure 2:
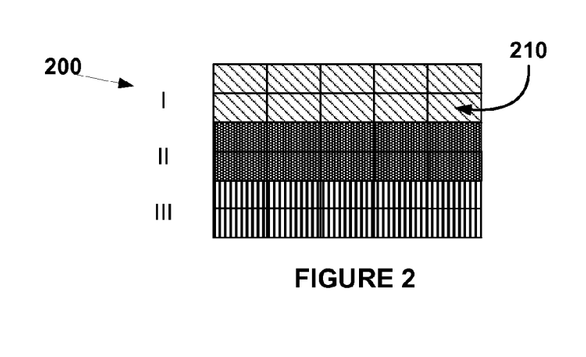
FIG. 2 shows a schematic view of an array of solar energy devices connected electronically in three parallel strings.

Referring now to FIG. 1, a schematic cross section of a field of five solar energy systems is shown facing the direction of the sun's rays. Each of the solar energy systems includes a tracker (A-E) that is comprised of a single pedestal which contains a single array (1-5) of solar energy units. The array 200 shown in a schematic view in FIG. 2, which may represent any of the arrays 1-5 of FIG. 1, includes 30 solar energy units 210 divided into three strings (I-III). The embodiment depicted in FIG. 2 is understood to be for illustrative purposes only, as the array 200 may include any number of solar energy units arranged in any number of strings. The solar energy units 210 are generally connected electrically in a series comprising a string, with the strings I-III connected in parallel. The series of units may contain a plurality of bypass diodes, which may limit the loss of power generated by a solar energy system in the event of failure of an individual solar energy unit.

The effects of shading or mechanical or electrical failure of an individual solar energy unit on the output of the individual and neighboring solar energy systems is strongly dependent on the arrangement and connection of strings in a system. The orientation and global position of the field of solar energy systems, as well as the time of year may all strongly affect the shade pattern projected onto individual solar energy systems and hence the power output of a field of solar energy systems. A reduction in the maximum power output of an individual solar energy system may also occur because of mechanical or electronic failure of a portion of solar energy units in a string or the obstruction of solar radiation to a portion of the string of solar energy units. Obstruction may be caused by any number of sources, e.g., dirt, debris, shade. The effect of partial obstruction, shading or failure of a portion of solar energy units on the power output of individual solar energy systems is highly dependent on the electrical arrangement of the strings of units in the system.

Figure 3:
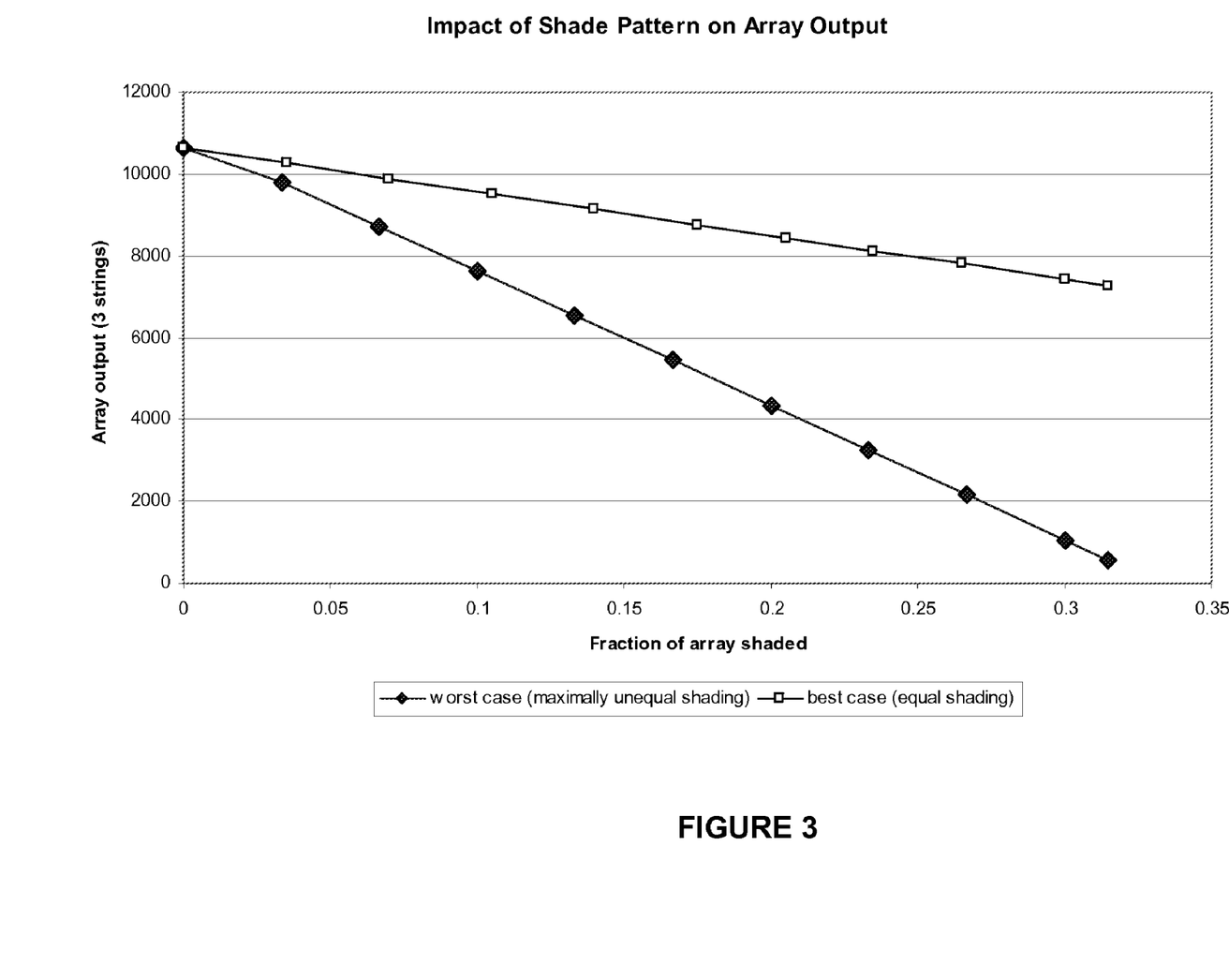
FIG. 3 depicts a graph illustrating the effect of shade on three parallel strings of solar energy devices.

FIG. 3 shows a simulation of increasing shading on an array of three strings of solar energy units electrically arranged in parallel, similar to the array 200 in FIG. 2. The power output of the system depends on finding the maximum power point (MPP) of the parallel strings. Two cases are shown. In one case (-□-), uniform shading such as cloud cover affects each string in the same manner. In a second case (-♦-), all of the shading occurs over a single string of the array, which would occur as a shadow lengthens over the array. When the strings of solar energy units are uniformly impaired (-□-), then the power output is affected at a rate proportional to the amount of shading, while non-uniform shading (-♦-), may be disproportionally deleterious to the total power output. To the extent that each string is impaired in a like manner (e.g., atmospheric haze, cloud cover), then the maximum power point of the array will correspond to the MPP's for each string individually. Hence, if shading is equal across each of the strings, the array MPP result will be equivalent to the result that would have been attained by the strings individually, and the effect of shading on array power output will be linear in area shaded. However, if the shading occurs over a portion of the array, such as on one string (-♦-), then the MPP of the shaded string will differ substantially from that of the unshaded strings. If a total MPP is determined for the three strings in parallel, then each of the strings will be operated away from its individual MPP, and the array power will decline more rapidly than the rate of shaded area. In the worst potential example, if one string is shaded entirely, there will be no power generated at the array level. Hence, a 33% shading may result in a 100% power loss.

When shading on a first solar energy system is caused by the arrangement and position of a second solar energy system, it would be beneficial for the second solar energy system to be controllably positioned to minimize the shading on the first solar energy system. While this may reduce the MPP of the second solar energy system, the first solar energy system would generate an improved solar energy production relative to a shaded solar energy system. The resultant sum of the solar energy generated from the field of solar energy systems would therefore be greater if a portion of solar energy systems were controllably oriented to minimize the shade on another portion of solar energy systems. In contrast, current controllers typically direct a tracker to follow the calculated direction of the sun's rays. Consequently, the power output of the field, as determined by the sum of power outputs of individual systems, may be sub-optimal due to structures that generate shade patterns on one or more individual solar energy systems in a field.

Thus, the present invention may improve the power output of a field of solar energy systems by maximizing the sum of power outputs in the field. The field level tracker controller may calculate an improved orientation of each solar energy system in a field and individually position each of the systems through communication with the solar array trackers. The improved configuration accounts for performance-reducing factors such as shading caused by surrounding structures and malfunctioning of individual systems. The field level tracker controller of the present invention may include a programmable controller in communication with the one or more individual trackers in the field, a storage means for storing a calculation algorithm, a means for inputting information to the algorithm, and means for controlling the position of the trackers. In one embodiment the tracker controller, also referred to as a field level tracker controller, may be located locally at the field of solar energy systems. In an alternative embodiment, the field level tracker controller may be located remotely and communicate with the tracker's (e.g., an internet connection) communication system. The storage means may be a secondary storage device (e.g., hard drive, flash memory drive, or other non-volatile devices). Input means may be power monitoring devices (e.g., AC grid intertie, inverter level AC or DC power measurement, string level measurement, or module level measurement), orientation sensing devices for the trackers (e.g., stepper positions, encoders, video devices), health monitoring devices (e.g., tracker motor current measurement), and weather and solar monitoring devices (e.g., wind speed and direction measurement devices, thermometers, spectrometers, DNI and GNI measurement, sky viewing video devices, etc.). Means for controlling can include a drive motor or software instructions for local controllers to implement tracker stow and controller standby modes.

Figure 4:
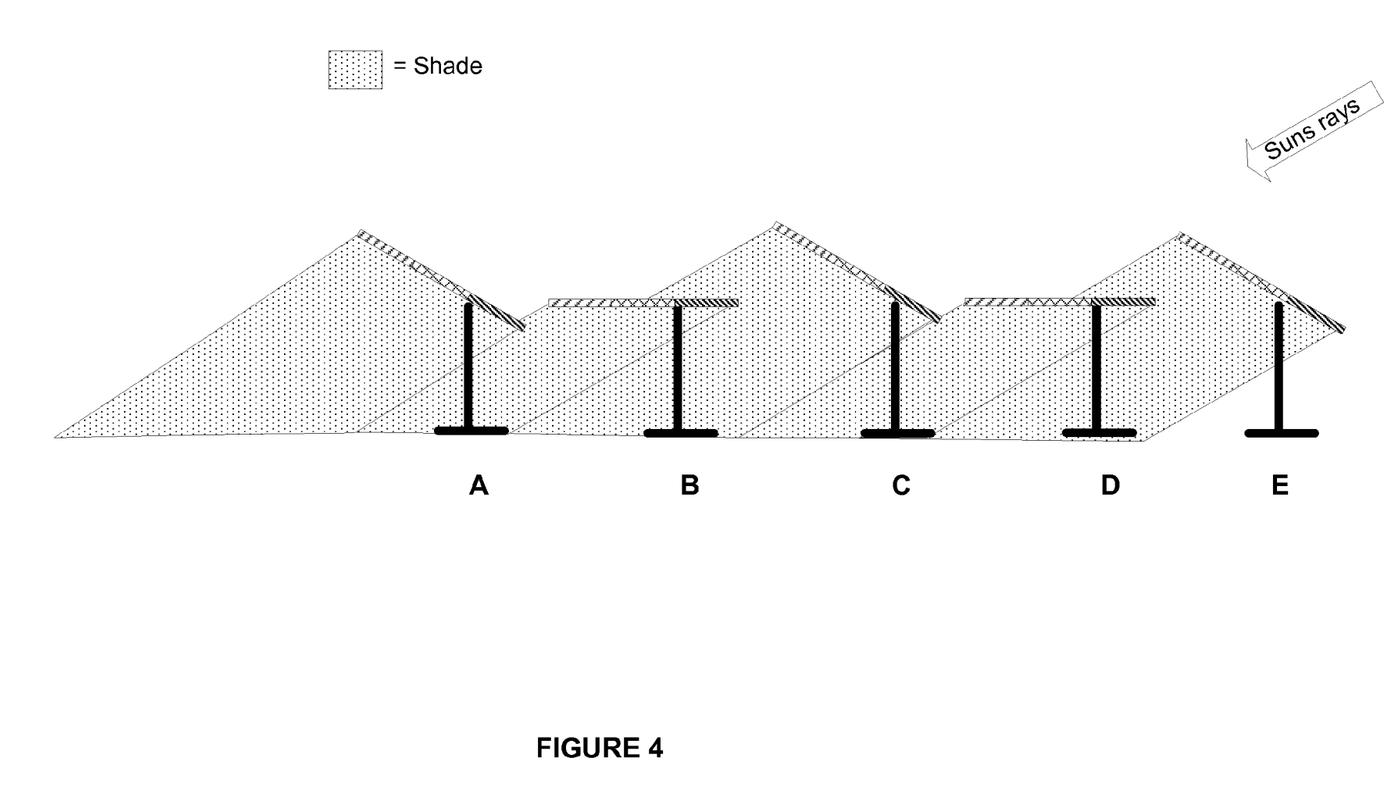
FIG. 4 depicts a schematic view of a field of solar energy systems oriented to maximize the potential sum of solar energy output of the field at a low solar elevation.

An example of an orientation of solar energy systems in a field may be seen in FIG. 4. In this figure solar energy systems B and D have been oriented to minimize the shade pattern on solar energy systems A and C. In this embodiment the solar power produced by a field of solar energy systems may be maximized by positioning trackers B and D to a stowed position. The field level tracker controller of this invention may determine the maximum potential power output of a field of solar energy systems and controllably position one or more trackers individually to realize that maximum potential power. In one embodiment the field level tracker controller may be located on-site at the field of solar energy systems. In an alternative embodiment, the field level tracker controller may be located remotely and communicate with the trackers (e.g., via an internet connection). A stow or deployment protocol may be empirically determined or calculated to provide the maximum power output for a field as the sun sets and rises each day. It is understood that the stow position may be any position which does not generate solar energy and generates a minimal shade pattern on neighboring solar energy systems. In one embodiment, the stow position for an array may be horizontal. In another embodiment, the stow position for an array may be vertical and parallel to the sun's rays. In yet another embodiment, the stow position may be dynamic. One aspect of orienting one or more solar energy systems in a stowed position is the maintenance of a minimal shade profile on neighboring solar energy systems as shade patterns change over time.

Figure 5:
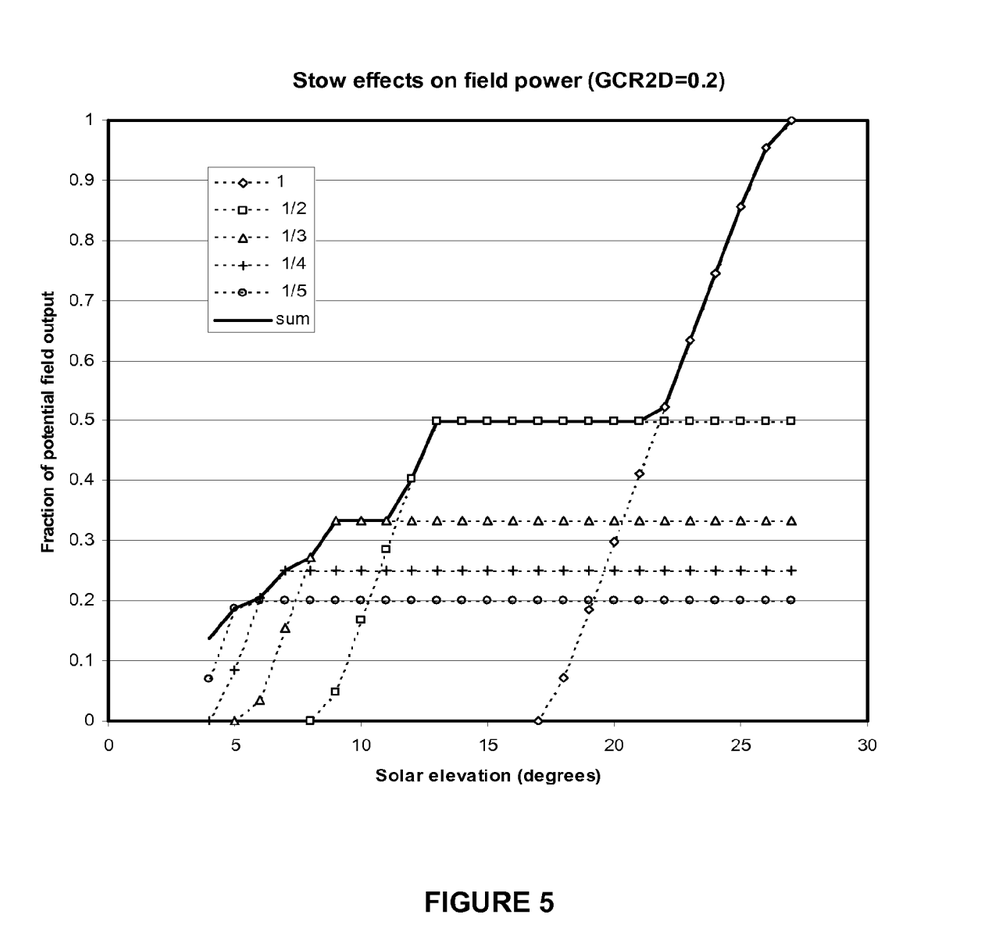
FIG. 5 shows a graph illustrating the maximum power output for a field of solar energy systems as individual solar energy systems are brought to a stowed position.

A simulated power output of a field of individually controlled solar energy systems and a stow protocol is graphically depicted in FIG. 5. This embodiment represents a protocol in which an increasing number of solar energy systems are oriented to a stowed position by the field level controller as the sun's elevation decreases, resulting in a composite total power output represented by a solid line in the graph. The graph depicts an example of potential power generated by a field of solar systems, each system comprised of a single array of three strings of solar energy units mounted on a single tracker. The graph shows simulated conditions of a field of solar energy systems oriented in a North/South direction at a solar equinox. The systems are distributed evenly at a two dimensional ground cover ratio (GCR2D) of 0.2, which corresponds to 20% of surface in shade with the sun at zenith. At a point during mid day when the elevation of the sun is above 26°, no shading from the systems impact the solar energy collection for this field and all of the systems may be oriented towards the sun (—◇—). As the solar elevation falls and the trackers tilt to face the arrays towards the sun, the shade pattern of individual solar energy systems may impact the solar energy output of the field due to shading of the nearest neighbor solar energy system. At a solar elevation of 19°, the shade caused by tilting trackers would reduce the field power output to zero because a single string on each array would be entirely shaded by its nearest neighbor. Thus, the field level controller directs alternating systems (½ of the systems operational, —□—) into a stowed position that eliminates shading on the intervening solar energy systems when the solar elevation falls below 22°. This results in a reduction of power loss as the shade pattern on adjacent solar arrays is removed. As the solar elevation falls below 12°, shade patterns will lengthen and the next nearest neighbor may be brought to a stow position to prevent the total loss of generated solar energy (⅓ of the systems operational, —Δ—). In one embodiment of this invention, two intervening solar energy systems may be removed from a solar tracking position, resulting again in a reduction of power loss as shade is removed from working systems. The pattern continues as the sun sets and more intervening systems may be brought offline into a minimal shading stowed position, in order to remove shade from working systems (¼ of systems operational —+—; and then ⅕ of systems —○—). Thus, as shade patterns lengthen across solar energy systems, the sum of the maximum potential power, represented by the solid line (______), continues to be generated from the field as the shade on working systems is minimized.

The field level tracker controller of this invention determines the improved system position for each individual system in a field of solar energy systems to maintain maximum potential field power. In one embodiment of this invention, the improved system position includes a stow protocol that generates a minimum shade pattern calculated by an algorithm using the locations and dimensions of individual solar energy systems or other structures in the field, the electronic arrangement of strings of solar energy units in each array, and the ephemeris equation which describes the location of the sun as a function of altitude and azimuth angle. In another aspect of this invention an improved deployment protocol is calculated by minimizing shading on solar energy systems as the sun rises each morning. One aspect of this invention is that the solar energy systems may be spaced with a higher GCR2D distribution in order to generate more power in a fixed area. FIG. 5 describes a stow pattern to account for lengthening shade patterns as solar elevation decreases during the course of a day. It is understood that a deployment pattern may also be calculated and implemented to maximize field power as the sun rises each day.

In another embodiment, the improved position for each solar energy system may be calculated by measuring the power generated by individual solar energy systems and comparing that to an expected power level. Power generation may be monitored by detecting electrical signals from any point after solar energy is converted to electricity, such as at the individual solar energy units, strings of units, or inverters. Power generation of each individual system may be compared to the average power generated by the field, or to a solar power detection device. These comparisons may determine whether observed decreases in power levels of individual systems are the result of current solar conditions or are indicative of the failure of individual solar energy systems. Power levels for individual systems may affected by the natural shade pattern generated by neighboring working systems during the course of solar tracking. Power levels for individual systems may also be affected by shade patterns from neighboring non-working solar energy systems. Non-working solar energy systems may be the result of tracking failure or a breakdown of one or more solar energy units or routine maintenance. Power levels for individual systems are also dependent on the various components of the systems themselves, such as the trackers, individual solar energy units, or the connections between them. The expected power value of an individual solar energy system may be calculated or measured. In one embodiment the expected value may be determined by calculating the maximum possible power for a system based on the known efficiency of the solar energy unit. In another embodiment, the expected value may be the power measured at the initialization of the solar energy system. A breakdown in any portion of a solar energy system may affect the power generation of that system as well as the power generation of neighboring systems. These effects may be minimized by the use of the present invention to calculate and direct the improved position of individual solar energy systems in a field in order to maximize the potential total field production.

Figure 6:
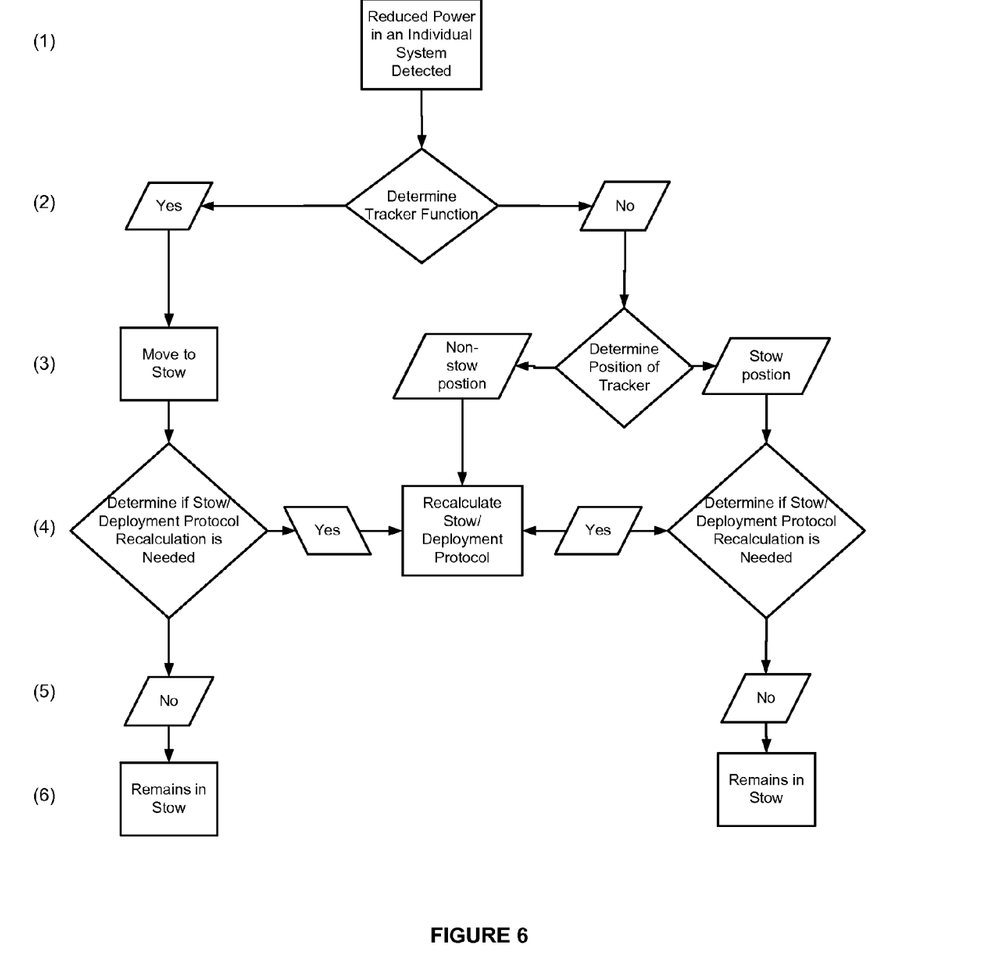
FIG. 6 depicts a flow chart for one embodiment of a process followed by a field level tracker controller of this invention when reduced power is detected from an individual solar energy system in a field.

One embodiment of this invention is depicted in the flow chart depicted in FIG. 6 describing the process of a field level tracker controller maximizing the potential energy output of a field of solar energy systems. Step 1 indicates the detection of reduced power in an individual solar energy system. The controller may detect reduced power in an individual system by comparison to an expected value for that system and the current output of the field of solar energy systems. These comparisons may determine if the power output is indicative of a malfunctioning system or merely the result of the current environmental or field conditions. Step 2 indicates that the field level tracker controller may now determine if the tracker is functioning in the individual system. Tracker function may be determined by any means e.g., video monitoring, step motor pulse detection, current flow in the tracker motor, and other means known in the art. If the tracker is functional, then during Step 3, the field level tracker controller may direct the tracker to orient the malfunctioning solar energy system to a stow position that results in reduced shading for neighboring systems. If the tracker is not functioning and thus unable to change its position, the field level tracker controller may determine whether neighboring systems will be negatively impacted by the shade produced by the malfunctioning solar energy system. In one case, the malfunctioning tracker is fixed in a position that does not impact neighboring systems. In another case, the malfunctioning tracker may generate a shade pattern on neighboring systems, while provide no useable energy. The field level tracker controller may determine the impact of a non-functioning solar energy system by any means. In one embodiment the field level tracker controller may determine if the measured power output of neighboring systems is impacted in a manner consistent with shading from the malfunctioning system. In another embodiment, the field level tracker controller may generate a signal for a technician to visit the field and conduct an inspection.

During Step 4, the field level tracker controller may assess the impact of the malfunctioning system on the current stow/deployment protocol and if needed, recalculate the protocol. Reassessment of the stow/deployment protocol may be by any means, e.g., computational, technician-assisted, or empirical. In one embodiment, the stowed system may be the first system stowed as the sun drops in elevation, and the last system deployed as the sun rises. In this embodiment, the field level tracker controller does not recalculate a new stow/deployment protocol (Steps 5, 6). In another embodiment, the field level tracker controller may calculate a new shade pattern that impacts the working solar energy systems in the field accounting for the dimensions, position and location of the malfunctioning system. In this embodiment the field level tracker controller may determine that the maximum power possible from the field of functioning and non-functioning solar energy systems requires a recalculation of the stow protocol. The field level tracker controller may recalculate the shade pattern of the malfunctioning solar energy system to determine which solar energy systems should be stowed first to maximize power output as shadows lengthen in the evening, and which solar energy systems should be deployed last as shadows shorten when the sun rises. The shade pattern may be calculated based on the ephemeris equation as well as the location and dimensions of the solar energy systems. The impact of shade pattern on power output may be calculated based on the location and dimensions of the solar energy systems as well as the electronic arrangement of solar energy units in an array.

Figure 7:
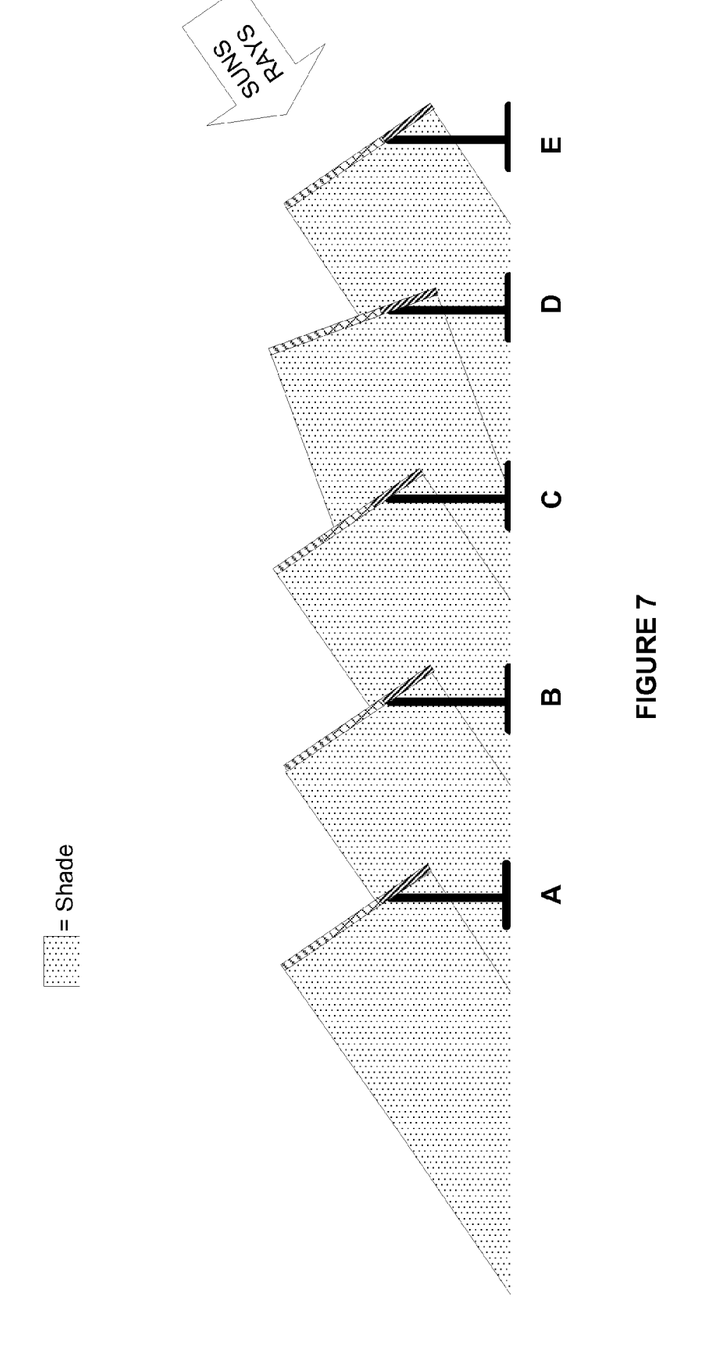
FIG. 7 depicts a schematic view of a field of solar energy systems including one malfunctioning system.
Figure 8:
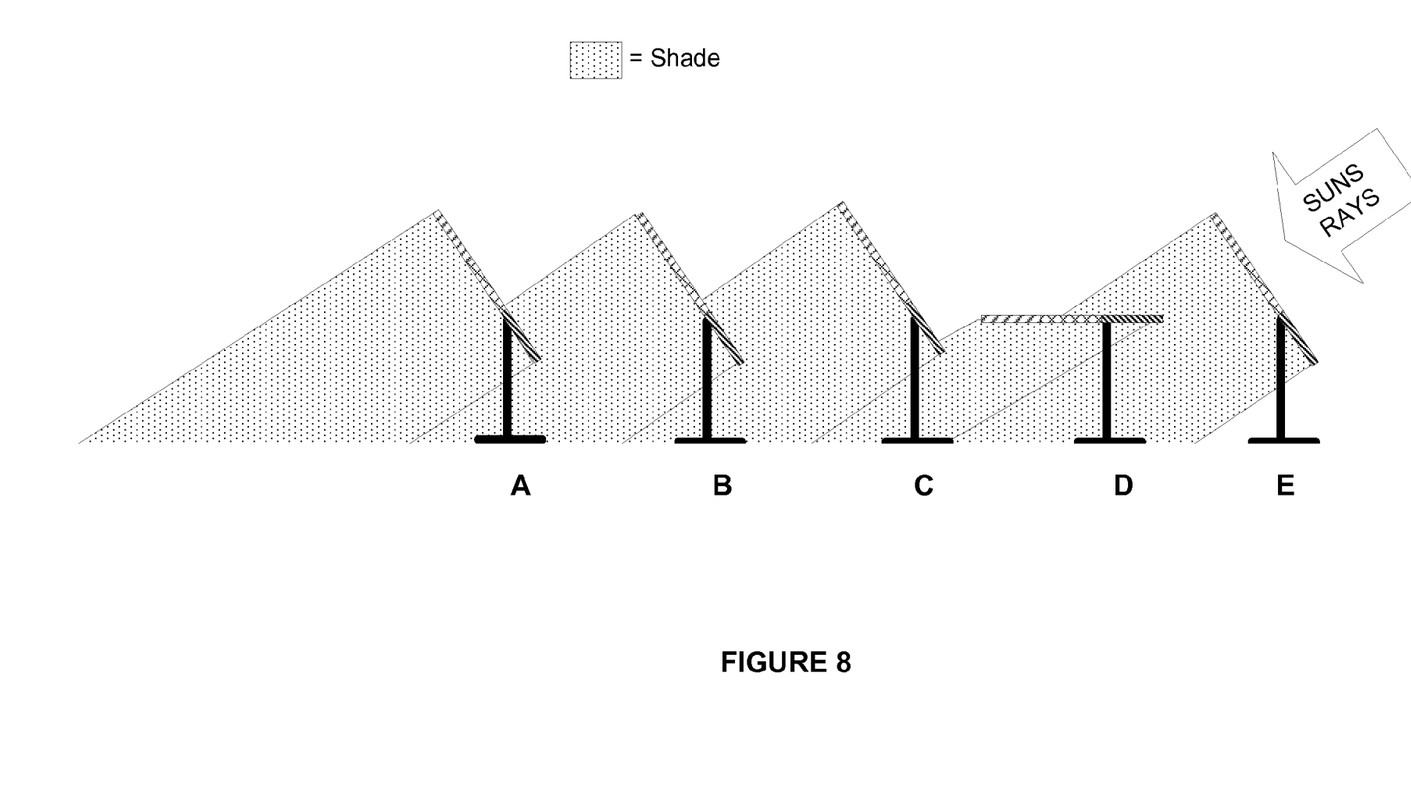
FIG. 8 depicts a schematic view of a field of solar energy systems including one stowed system.
Figure 9:
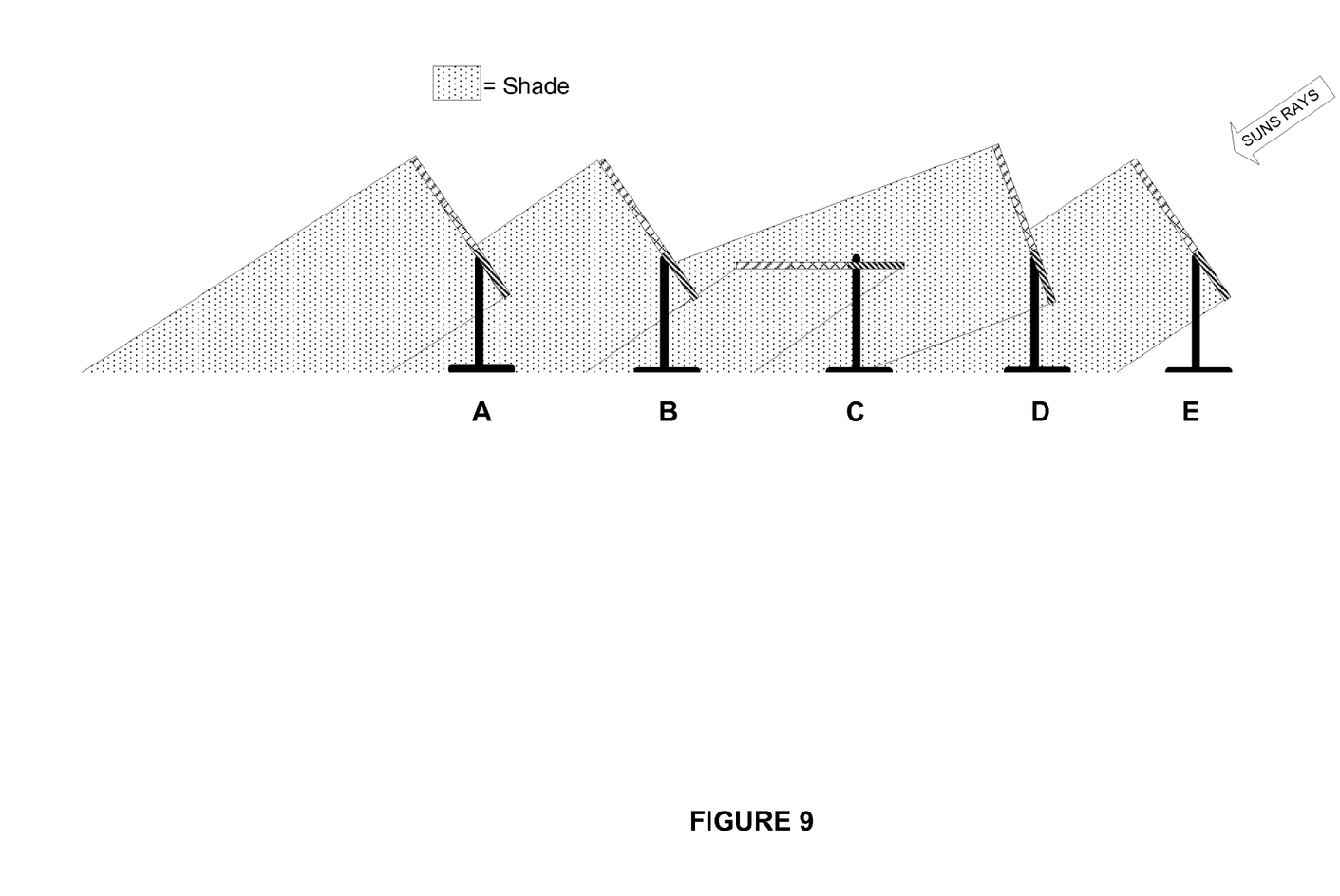
FIG. 9 depicts a schematic view of a field of solar energy systems including one malfunctioning system and one stowed system.

In addition to providing a maximum power output for a field of solar energy systems as solar elevation decreases, the present invention may controllably position individual solar energy systems to provide maximum power in the event of a reduced output of one or more solar energy systems. An example of a malfunctioning solar energy system is shown in FIG. 7 where malfunctioning system D is depicted in a field of solar energy systems A-E. The field level tracker controller of this invention may detect a malfunctioning solar energy system and calculate a response that maintains the maximum potential field power output. In one example, malfunctioning solar energy system is comprised of an inoperative solar array with a functioning tracker. The field level tracker controller of this invention may determine that the tracker is functional by detecting the tracker step motor pulse for example. FIG. 8 depicts the response of the field level tracker controller as system D is brought to a stow position to minimize shade on system C and maximize field power. In another example shown in FIG. 9, the field level tracker controller of this invention may be unable to control the position of a malfunctioning solar energy system D in which the tracker itself is not responding. In this case, the field level tracker controller may bring neighboring solar energy systems such as C into a stow position. This is done because malfunctioning solar energy system D may negatively impact the power production of system C, which in turn could impact the energy production of system B. Thus, the field level tracker controller determines that for the scenario of FIG. 9 where system D has a malfunctioning tracker, the improved field configuration is for system C to be stowed in order for maximum potential power output from the field to be achieved. Alternative embodiments for the field level tracker controller of this invention include programmably positioning individual solar energy systems in a field into a stow position for periodic maintenance or weather related protection.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed:

1. A controller system comprising:
a field of two or more solar energy systems, wherein each system comprises one or more solar energy arrays mounted on a solar tracker, and wherein the arrays are comprised of one or more solar energy units having an electronic arrangement; and
a field level tracker controller in communication with the field of solar energy systems, wherein the controller is capable of receiving data on locations and physical dimensions of individual solar arrays in the field of solar energy systems and the electronic arrangement of solar energy units in an array, and wherein the field level tracker controller controls the position of individual solar trackers in the field.

2. The controller system of claim 1, wherein the tracker controller further comprises a storage device and an algorithm stored in the storage device, wherein the algorithm calculates a configuration of individual solar energy systems that improves the sum of the potential power outputs of the solar energy systems.

3. The controller system of claim 2, wherein the configuration of the solar energy systems provides a minimum shade pattern on one or more solar energy systems.

4. The controller system of claim 2, wherein the algorithm uses the locations and physical dimensions of individual solar arrays and the electronic arrangement of solar energy units in an array.

5. The controller system of claim 1, wherein the field level tracker controller is capable of receiving data on the power output of individual solar energy systems.

6. The controller system of claim 1, wherein the solar energy units comprise concentrated photovoltaic solar energy units.

7. The controller system of claim 1, wherein the field level tracker controller is located remotely from the field of solar energy systems.

8. The controller system of claim 2, wherein the configuration of the solar energy systems comprises positioning one or more solar energy systems in a stowed position.

9. The controller system of claim 2, wherein the algorithm uses a calculated shade pattern of nearby structures, and wherein the nearby structures are selected from the group consisting of solar energy systems, wind turbines, trees, landscape elements and buildings to calculate a configuration of individual solar energy systems for maximizing the sum of the potential power outputs of the solar energy systems.

10. A method for constructing a solar energy system field level controller, comprising:
providing a field level tracker controller, wherein the field level tracker controller has a storage device, and wherein the field level tracker controller is capable of receiving input data;
inputting the location and physical dimensions of individual solar energy systems in a field of solar energy systems into the field level tracker controller;
placing the field level tracker controller in communication with the field of solar energy systems; and
storing an algorithm in the storage device, wherein the algorithm calculates an improved configuration for the solar energy systems based on the input data to maximize the sum of power outputs of the field of solar energy systems.

11. The method of claim 10, wherein the solar energy systems are concentrated photovoltaic solar energy systems.

12. The method of claim 10, wherein the field level tracker controller is provided at a remote location from the field of solar energy systems.

13. The method of claim 10, wherein the improved configuration comprises one or more solar energy systems in a stowed position.

14. The method of claim 10, wherein the algorithm further comprises calculating a shade pattern of nearby structures, wherein the nearby structures is selected from the group consisting of solar energy systems, wind turbines, trees, landscape elements and buildings.

15. The method of claim 10, further comprising inputting the electronic arrangement of solar energy units in an array into the field level tracker controller.

16. The method of claim 10, further comprising inputting the power output levels of the solar energy systems into the field level tracker controller.

17. A field level controller system comprising:
a field of two or more solar energy systems, wherein each system comprises one or more solar energy arrays mounted on a solar array tracker, and wherein the arrays are comprised of one or more solar energy units;
a field level tracker controller in communication with the field of solar energy systems, wherein the field level tracker controller is capable of receiving data on the locations and physical dimensions of individual solar arrays in the field of solar energy systems, and wherein the field level tracker controller individually controls the position of each solar array tracker;
wherein the tracker controller further comprises an algorithm; and
wherein the algorithm calculates a configuration of individual solar energy systems that improves the sum of the potential power outputs of the solar energy systems.

18. The controller system of claim 17, wherein the arrays comprise one or more concentrated photovoltaic solar energy units.

19. The controller system of claim 17, wherein the field level tracker controller is capable of receiving data on the power output of individual solar energy systems.

20. The controller system of claim 17, wherein the field level tracker controller further comprises a weather monitoring device.

21. A method for maximizing the power output of a field of solar energy systems comprising:
providing a field level tracker controller, wherein the field level tracker controller comprises an algorithm;
providing a field of solar energy systems comprised of one or more solar energy arrays mounted on a solar array tracker, wherein the arrays are comprised of one or more solar energy units electrically connected in a string arrangement;
inputting the location and physical dimensions of individual solar energy systems in a field of solar energy systems into the field level tracker controller;
inputting the string arrangement of solar energy devices into field level tracker controller;
placing the field level tracker controller in communication with the field of solar energy systems; and
using the algorithm to calculate a configuration of individual solar energy systems for maximizing the sum of the potential power outputs of the solar energy systems.

22. The controller system of claim 21, wherein the field level tracker controller further comprises a weather monitoring device.

23. The controller system of claim 17, wherein the configuration of the solar energy systems provides a minimum shade pattern on one or more solar energy systems.

24. The controller system of claim 17, wherein the solar energy units have an electronic arrangement; and wherein the algorithm uses the locations and physical dimensions of individual solar arrays and the electronic arrangement of solar energy units in an array.

* * * * *